(No Model.)
W. H. KNIGHT.
ELECTRIC RAILWAY SYSTEM.
No. 458,582. Patented Sept. 1, 1891.
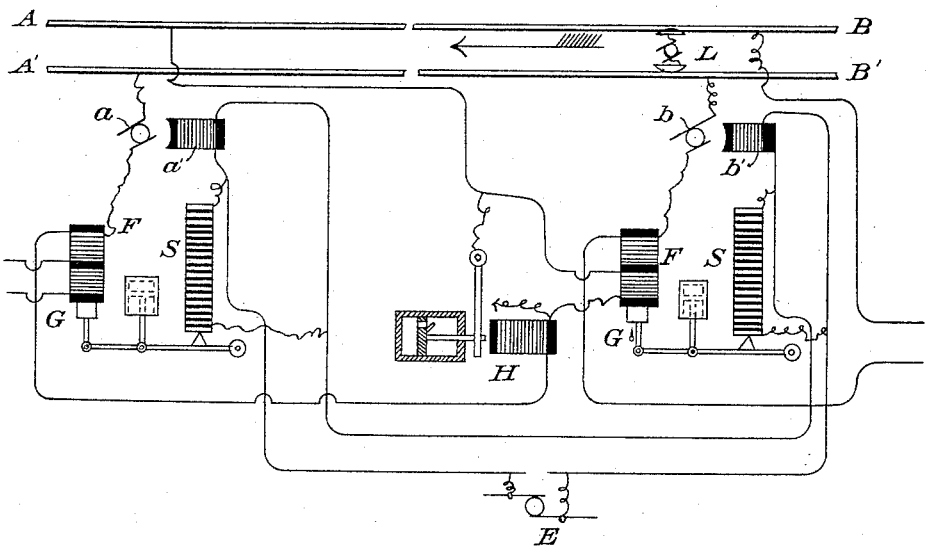
Attest
Geo. T. Smallwood.
Leon G. Ghetti.
Inventor
Walter H. Knight
By Bentley & Knight
atty

UNITED STATES PATENT OFFICE.

WALTER H. KNIGHT, OF NEW YORK, N. Y.

ELECTRIC-RAILWAY SYSTEM.

SPECIFICATION forming part of Letters Patent No. 458,582, dated September 1, 1891.

Original application filed May 11, 1885, Serial No. 165,101. Divided and this application filed July 3, 1888. Serial No. 278,988.
(No model.)

*To all whom it may concern:*

Be it known that I, WALTER H. KNIGHT, a citizen of the United States, residing at New York, in the county of New York and State of New York, have invented certain new and useful Improvements in Electric-Railway Systems, of which the following is a specification.

My invention relates to electric railways in which there are a number of sections, each supplied with a separate generator; and the present application is a division of my application, Serial No. 165,101, filed May 11, 1885. In a system of this kind it is evident that when a locomotive leaves a section and there are none others on that section the main circuit of the corresponding generator must be broken, and in a road of any practical dimensions the current employed would be of a character to form a long and dangerous arc when the circuit is broken. Therefore in passing from one section to another I cause the closure of the circuit of the leading section to reduce for an instant the current of the preceding generator, so that the current in its circuit will be practically *nil* at the moment the contacts of the locomotive pass over the break between the two sections.

In the accompanying drawing, which is a diagrammatic view of my device, A A' and B B' are the conductors of two succeeding sections, and $a$ and $b$ their respective generators, $a'$ and $b'$ being the field-magnets. The field-magnets are excited by a common generator E, and around each magnet is a shunt containing a variable resistance, such as a pile of carbon plates S. This resistance is controlled by a magnet F in the armature-circuit of each generator, so that a constant current is maintained by each machine. Now on each magnet F, I wind an additional coil G, which is placed in the armature-circuit of the succeeding generator. Thus the armature-circuit of $a'$ may be traced from A' through regulator-magnet F, through magnet H, whose function will be explained hereinafter, through coil G on the regulator-magnet of the preceding machine to A. When the locomotive L, moving in the direction of the arrow, closes the circuit between A and A', the current passes by the path just described, and the power of G, added to that of the normal magnet F, compresses tightly the carbon pile S, and thereby partially shunts the current from magnet $b'$ of generator $b$, so that the electro-motive force of $b$ is lessened to the point where it equals the counter electro-motive force of the motor, and the circuit can be broken without an arc. The magnet H in the armature-circuit of $a'$ draws up its armature slowly against a dash-pot and finally short-circuits G, when the apparatus will be restored to its normal condition.

What I claim as new, and desire to secure by Letters Patent, is—

1. The combination of a number of generators connected, respectively, to succeeding sections of an electric railway, with a number of electric locomotives on said railway, and means for reducing the current of any generator at the instant when a locomotive is leaving the corresponding section of road.

2. The combination, with a number of generators connected, respectively, to succeeding sections of an electric railway, of electric locomotives on said railway, and means controlled by the generator of one section for reducing the current of a preceding section when a locomotive is passing over the break between the two sections.

WALTER H. KNIGHT.

Witnesses:
E. M. BENTLEY,
LEON G. GHETTI.